United States Patent [19]

Wick et al.

[11] 4,176,113
[45] Nov. 27, 1979

[54] PROCESS FOR DYEING POLYESTERS IN THE MELT

[75] Inventors: Arnold Wick, Therwil; Max Jost, Oberwil, both of Switzerland

[73] Assignee: Ciba-Geigy Corporation, Ardsley, N.Y.

[21] Appl. No.: 844,326

[22] Filed: Oct. 21, 1977

[30] Foreign Application Priority Data

Nov. 2, 1976 [CH]  Switzerland .................. 13793/76

[51] Int. Cl.² ............................................... C08K 5/08
[52] U.S. Cl. .................................... 260/40 P; 260/377
[58] Field of Search ......................... 260/40 P, 377

[56] References Cited

U.S. PATENT DOCUMENTS 3,720,693  3/1973  Peters et al. .................. 260/40 P X

FOREIGN PATENT DOCUMENTS 1000887  8/1965  United Kingdom .

Primary Examiner—Sandra M. Person

[57] ABSTRACT

Use of anthraquinone derivatives of the formula

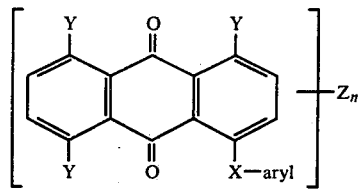

wherein X is —NH— or —S—, one Y is —NHCOR, R being an alkyl, aryl or heterocyclic residue, the other Y are hydrogen, Z is halogen, and n is 0, 1, 2 or 3, whereby Z may be 1 to 3 halogen bound to aryl and/or anthraquinone nucleus and/or the residue R, for dyeing polyesters in the melt.

9 Claims, No Drawings

PROCESS FOR DYEING POLYESTERS IN THE MELT

It has been found that anthraquinone derivatives of the formula

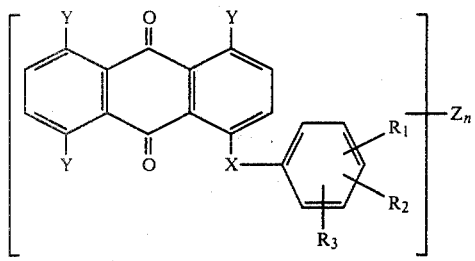

wherein $R_1$ is hydrogen, halogen, alkyl or alkoxy having 1-4 C atoms, and $R_2$ and $R_3$ are hydrogen, halogen or alkyl having 1-4 C atoms, with $R_2$ and $R_3$ being hydrogen if $R_1$ is alkoxy, X is an —NH— group or an —S— atom, one Y is the radical of the formula —NHCOR and the other two Y groups are hydrogen, with R being alkyl having 1-4 C atoms, a mononuclear five- or six-membered heterocyclic radical or a radical of the formula

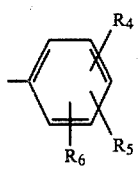

in which $R_4$ is hydrogen, halogen, hydroxyl, alkyl or alkoxy having 1-4 C atoms, phenyl or phenoxy, $R_5$ and $R_6$ are hydrogen, and $R_5$ can also be halogen or alkyl having 1-4 C atoms and $R_6$ also halogen if $R_4$ is halogen or alkyl, Z is halogen and n is 0 or the number 1, 2 or 3, and 1-3 Z's can be bound as substituents $R_1$ to $R_3$ and/or as substituents on the anthraquinone nucleus or on the radical R, are excellently suitable for dyeing polyesters in the melt.

Halogen denotes chlorine or particularly bromine. Of special interest as colouring substances (dyestuffs) soluble in polymers are compounds of the formula 2

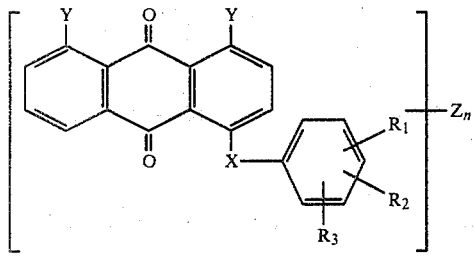

wherein n is 0, 1 or 2 if halogen is on the anthraquinone nucleus or as radical $R_1$ and $R_3$ in the molecule, and X is an —NH— group or an —S— atom, one Y is a radical of the formula —NHCOR and the other Y is hydrogen, with R and $R_1$ to $R_3$ having the above meanings; or mixtures of compounds of the formula 2 wherein n is 1, 2 or 3, which are obtained by subsequent halogenation, especially bromination, from compounds of the formula 2, with the halogen atoms introduced occurring mainly in different positions of the phenyl nucleus bound to X.

Particularly advantageous properties are displayed by colouring substances of the formula 3

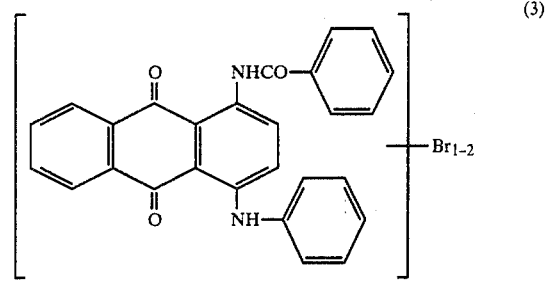

which produce deeply coloured, reddish-blue to violet dyeings in polyester; and also by deeply coloured yellow colouring substances of the formula 4

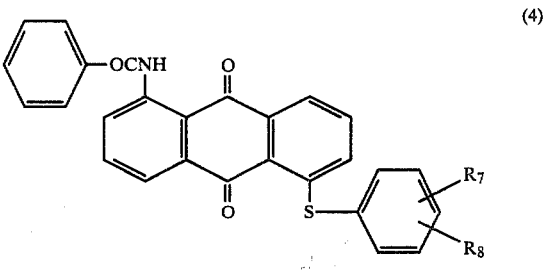

wherein $R_7$ and $R_8$ are hydrogen or methyl or ethyl groups; and by scarlet colouring substances of the formula 5

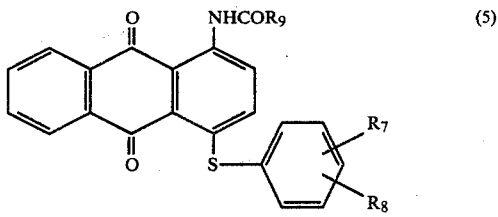

wherein $R_7$ and $R_8$ have the above meaning, and $R_9$ is a methyl group or a phenyl group optionally substituted by chlorine or by a methyl or ethyl group; all of which have excellent fastness to bleeding, to rubbing and to light.

The anthraquinone derivatives of the formula I which are used according to the invention can be obtained by processes comprising
  (a) acylating a compound of the formula 6

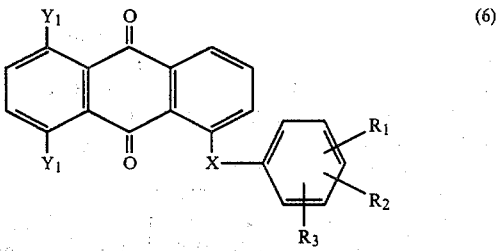

with a carboxylic acid chloride of the formula 7

R—COCl (7)

where in the formulae 6 and 7 the symbols, R, $R_1$ to $R_3$ and X have the aforesaid meanings, and one $Y_1$ is an amino group and the other $Y_1$ is hydrogen; or (b) reacting an anthraquinone compound of the formmula 8

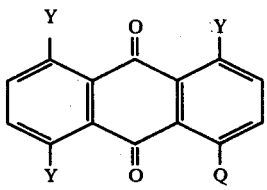 (8)

with an aniline of the formula 9

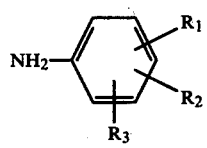 (9)

or with a thiophenol of the formula 10

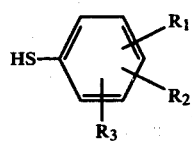 (10)

where in the formulae 8 to 10 the symbols $R_1$ to $R_3$ and Y have the aforegiven meanings, and Q is halogen or the nitro group; or (c) reacting an anthraquinone compound of the formula 11

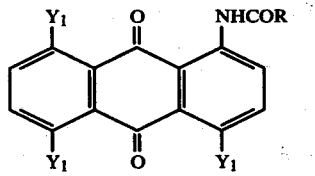 (11)

with a halogenobenzene of the formula 12

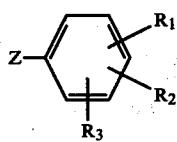 (12)

where in the formulae 11 and 12 the symbols R, $R_1$ to $R_3$ and Z have the aforegiven meanings, and one $Y_1$ is an amino group and the other $Y_1$ is hydrogen.

By subsequent halogenation, particularly bromination, of the anthraquinone derivatives obtained by the processes (a) to (c), there can be produced the compounds of the formula 1 wherein Z is halogen, especially bromine, and n is a nummber from 1 to 3, particularly 1. The subsequent halogenation is advisable especially in the case where either none or only one of the radicals $R_1$ to $R_6$ is halogen. The compounds resulting from subsequent halogenation are obtained as readily crystallising substances in high yield; and in connection therewith it is surprising that the colouring substances concerned, which in themselves are difficultly soluble, go into solution in the melt dyeing of polyester and produce dyeings which have fastness to light and to bleeding and, after thermofixing of the dyed yarn, also fastness to rubbing.

For production according to the process variant (a), the following starting compounds of the formula 6 are for example suitable:

1-amino-4-anilinoanthraquinone,
1-amino-4-o,m or p-toluidinoanthraquinone,
1-amino-4-xylidinoanthraquinone,
1-amino-4-trimethylanilinoanthraquinone,
1-amino-4-p-ethylanilinoanthraquinone,
1-amino-4-p-tert-butylanilinoanthraquinone,
1-amino-4-anisidinoanthraquinone,
1-amino-4-phenethidinoanthraquinone,
1-amino-4-o,m or p-chloroanilinoanthraquinone,
1-amino-4-o,m or p-bromoanilinoanthraquinone,
1-amino-4-dichloroanilinoanthraquinone,
1-amino-4-trichloroanilinoanthraquinone, and to a limited extent, on account of difficult acccessibility, also the corresponding 1-amino-5 or 8-substituted derivatives; also:

1-amino-4,5 or 8-phenylmercaptoanthraquinone,
1-amino-4,5 or 8-o,m or p-methylphenylmercaptoanthraquinone,
1-amino-4,5 or 8-dimethylphenylmercaptoanthraquinone,
1-amino-4,5 or 8-ethylphenylmercaptoanthraquinone,
1-amino-4,5 or 8-chlorophenylmercaptoanthraquinone,
1-amino-4,5 or 8-dichlorophenylmercaptoanthraquinone;

which are acylated for example with the following benzoyl chlorides: chlorides:

benzoyl chloride,
o, m or p-toluyl chloride,
2,3, 2,4 or 3,4-dimethylbenzoyl chloride,
o, m or p-chlorobenzoyl chloride,
o, m or p-hydroxybenzoyl chloride, 2,4, 2,5 or 3,4-dichlorobenzoyl chloride,
chloromethylbenzoyl chloride,
4-phenoxybenzoyl chloride,
4-phenylbenzoyl chloride.

Suitable for production according to variant (b) are for example the following halogenobenzoylaminoanthraquinones or nitrobenzoylaminoanthraquinones:

1-chloro-4,5 or 8-benzoylaminoanthraquinone,
1-bromo-4,5 or 8-benzoylaminoanthraquinone,
1-nitro-4,5 or 8-benzoylaminoanthraquinone, which can be condensed for example with the following anilines or thiophenols:

aniline,
o,m or p-toluidine,
2,3, 2,4, 2,5, 3,4 or 3,5-xylidine, 2,4 or 5-trimethylaniline
4-ethylaniline,
4-tert.-butylaniline,
anisidines,
phenethidines,
o,m or p-chloroaniline,
2,3, 2,4, 2,5, 3,4 or 3,5-dichloroaniline,
2,3,4- or 2,4,5-trichloroaniline,
chloromethylanilines,
thiophenol,
o,m or p-methylthiophenol, dimethylthiophenols,
ethylthiophenols,
o,m or p-chlorothiophenol,
dichlorothiophenols.

The acylations according to (a) are performed in the customary manner by reaction of the aminoanthraquinone with the carboxylic acid chloride in a higher-boiling inert solvent, such as toluene, xylene, chlorobenzene, dichlorobenzene or nitrobenzene.

The condensation of the halogeno- or nitrobenzoylaminoanthraquinones with the anilines according to (b) is performed preferably in an excess of the base or alternativvely in a solvent, such as xylene, dichlorobenzene or nitrobenzene, in the presence of an acid-binding agent, such as alkali carbonate, and of a copper catalyst. The corresponding reaction with the thiophenols is advantageously carried out in solvents such as alcohol, amyl alcohol, Cellosolve, DMF, DMSO or tetraline.

Halogenation is performed by generally known methods. Suitable halogenating agents are elementary halogen, such as chlorine and especially bromine, or compounds which can transfer active halogen, such as sulphuryl chloride or thionyl chloride.

The colouring substance to be halogenated is preferably suspended or dissolved in a diluent such as water, hydrochloric acid or sulphuric acid, or especially in an organic solvent, e.g. chlorobenzene, o-dichlorobenzene, trichlorobenzene and, in particular, nitrobenzene; and treated in a temperature range of $-10°$ to $150°$ C., preferably $20°-60°$ C., with the halogenating agent, optionally in the presence of a halogenating catalyst, such as iodine, or of an iron salt.

As polyesters to be dyed, there may be mentioned in particular those which are obtained by polycondensation of terephthalic acid or esters thereof with glycols of the formula $HO-(CH_2)_n-OH$ wherein n is the number 2-10, or with 1,4-di-(hydroxymethyl)-cyclohexane, or by polycondensation of glycol ethers of hydroxybenzoic acids, for example p-($\beta$-hydroxyethoxy)-benzoic acid. The term 'linear polyesters' embraces also copolyesters which are obtained by partial replacement of the terephthalic acid by another dicarboxylic acid or a hydroxycarboxylic acid and/or by partial replacement of the glycol by another diol.

Of particular interest however are the polyethylene terephthalates.

The polyesters to be dyed are intimately mixed advantageously in the form of powder, chips or granules with the dyestuff. This can be effected for example by coating of the polyester particles with the finely divided dry dyestuff powder, or by treatment of the polyester particles with a solution or dispersion of the dyestuff in an organic solvent and subsequent removal of the solvent.

Finally, the dyestuff can be added also directly to the melted polyester, or before or during polycondensation of the polyethyleneterephthalate.

Depending on the depth of colour desired, the ratio of dyestuff to polyester can vary within wide limits. In general it is advisable to use 0.01-2 parts of dyestuff to 100 parts of polyester.

The polyester particles treated in this manner are melted by known processes in an extruder and extruded into the form of articles, particularly sheets or fibres, or are cast into the form of plates.

Evenly and deeply dyed objects having a high degree of fastness to light are obtained. The dyed fibres obtainable according to the process of the invention are furthermore distinguished by having excellent fastnesss to bleeding and rubbing.

A particular advantage of the dyestuffs to be used according to the invention is that they dissolve in the polyester melt and surprisingly withstand high temperatures up to $300°$ C. without decomposing, so that the dyeings obtained are considerably clearer than those obtained using insoluble pigments.

The term 'parts' in the following Examples denotes parts by weight.

EXAMPLE 1

A non-delustred polyethylene terephthalate granulate suitable for producing fibres is shaken together with 1% of one of the colouring substances described in the following Examples, in a closable vessel on a shaking machine for 15 minutes. The evenly dyed granules are spun on a melt spinning machine ($285° \pm 3°$, retention time in the spinning machine about 5 minutes) into filaments which are drawn and spooled on a draw twister. Brilliant dyeings are obtained by virtue of the solubility of the dyestuffs in polyethylene terephthalate. The dyed material can be treated and tested as follows:

(a) Thermofixing

A specimen of the dyed material is treated in a precision pressing machine for 30 seconds at $180°$, and is additionally afterfixed for 30 minutes at $135°$.

(b) Testing of the fastness to rubbing after thermofixing

Dry undyed cotton fabric or polyethylene terephthalate fabric is moved backwards and forwards in a Crockmeter ten times, with a pressure of 900 g within 10 seconds, over a 10 cm long specimen of the dyed and thermofixed material; and the staining of the undyed material is then assessed.

(c) Testing of the staining (bleeding) during thermofixing

A specimen of the dyed material is treated together with an undyed comparative fabric (polyamide, polyester) in a precision pressing machine for 30 seconds at $180°$.

EXAMPLES 2-49

The colouring substances listed in the following Table are applied according to Example 1 in polyester, with dyeings of the given shades being obtained.

| Example | Colouring substance | Shade on PES |
|---------|---------------------|--------------|
| 2 | 1-anilino-4-benzoylamino-anthraquinone | blue |
| 3 | 1-anilino-4-(4'-chlorobenzoylamino)-anthraquinone | blue |
| 4 | 1-(4'-toluidino)-4-benzoylamino-anthraquinone | blue |
| 5 | 1-anilino-4-(2'-chlorobenzoylamino)-anthraquinone | blue |
| 6 | 1-anilino-4-(3'-chlorobenzoylamino)-anthraquinone | blue |
| 7 | 1-anilino-4-(2'-fluorobenzoylamino)-anthraquinone | violet |
| 8 | 1-anilino-4-(2',4'-dichlorobenzoylamino)-anthraquinone | blue |
| 9 | 1-anilino-4-(2',5'-dichlorobenzoylamino)-anthraquinone | violet |
| 10 | 1-anilino-4-(4'-hydroxybenzoylamino)-anthraquinone | blue |
| 11 | 1-anilino-4-(4'-methylbenzoylamino)-anthraquinone | blue |
| 12 | 1-anilino-4-(2',4'-dimethyl- | blue |

-continued

| Example | Colouring substance | Shade on PES |
|---|---|---|
|  | benzoylamino)-anthraquinone |  |
| 13 | 1-anilino-4-(4'-tert-butyl-benzoyl-amino)-anthraquinone | blue |
| 14 | 1-anilino-4-(4'-methoxybenzoyl-amino)-anthraquinone | blue |
| 15 | 1-anilino-4-(4'-2'''-acetoylethyloxy-benzoylamino)-anthraquinone | blue |
| 16 | 1-anilino-4-(4'-phenylbenzoylamino)-anthraquinone | blue |
| 17 | 1-anilino-4-(4'-phenoxy-benzoyl-amino)-anthraquinone | blue |
| 18 | 1-anilino-4-(2'-thiophenoylamino)-anthraquinone | blue |
| 19 | 1-anilino-4-acetylamino-anthraquinone | blue |
| 20 | 1-anilino-4-n-propionylamino-anthraquinone | blue |
| 21 | 1-(4'-toluidino)-4-(4'-chloro-benzoylamino)-anthraquinone | blue |
| 22 | 1-(4'-toluidino)-4-acetylamino-anthraquinone | blue |
| 23 | 1-(2'-ethylanilino)-4-benzoyl-aminoanthraquinone | blue |
| 24 | 1-(4'-ethylanilino)-4-benzoyl-anthraquinone | blue |
| 25 | 1-(2',4'-dimethylanilino)-4-benzoylaminoanthraquinone | blue |
| 26 | 1-(2'-4'-dimethylanilino)-4-(4'-chlorobenzoylamino)-anthraquinone | blue |
| 27 | 1-(2',4'-dimethylanilino)-4-(4'-phenylbenzoylamino)-anthraquinone | blue |
| 28 | 1-(2',4'-dimethylanilino)-4-acetylaminoanthraquinone | blue |
| 29 | 1-(2',5'-dimethylanilino)-4-benzoylaminoanthraquinone | blue |
| 30 | 1-(2',6'-dimethylanilino)-4-benzoylaminoanthraquinone | violet |
| 31 | 1-(2',6'-dimethylanilino)-4-acetylaminoanthraquinone | violet |
| 32 | 1-(2',4',6'-trimethylanilino)-4-acetylaminoanthraquinone | violet |
| 33 | 1-(2',4',6'-trimethylanilino)-4-(2'-thiophenoylamino)-anthraquinone | blue |
| 34 | 1-(2'-chloroanilino)-4-benzoylamino-anthraquinone | violet |
| 35 | 1-(2'-chloroanilino)-4-acetylamino-anthraquionone | violet |
| 36 | 1-(3'-chloroanilino)-4-benzoyl-aminoanthraquinone | violet |
| 37 | 1-(4'-chloroanilino)-4-benzoyl-aminoanthraquinone | blue |
| 38 | 1-(4'-chloroanilino)-4-acetylamino-anthraquinone | blue |
| 39 | 1-(2',4'-dichloroanilino)-4-benzoylaminoanthraquinone | violet |
| 40 | 1-(2',5'-dichloroanilino)-4-benzoylaminoanthraquinone | violet |
| 41 | 1-(3',4'-dichloroanilino)-4-benzoyl-aminoanthraquinone | violet |
| 42 | 1-anilino-5-benzoylamino-anthraquinone | claret |
| 43 | 1-(4'-ethylanilino)-5-benzoyl-aminoanthraquinone | claret |
| 44 | 1-(2',4'-dimethylanilino)-5-benzoylaminoanthraquinone | claret |
| 45 | 1-(2',5'-dimethylanilino)-5-benzoylaminoanthraquinone | claret |
| 46 | 1-anilino-8-benzoylamino-anthraquinone | claret |
| 47 | 1-(4'-ethylanilino)-8-benzoyl-aminoanthraquinone | claret |
| 48 | 1-(2',4'-dimethylanilino)-8-benzoylaminoanthraquinone | violet |
| 49 | 1-(2',5'-dimethylanilino)-8-benzoylaminoanthraquinone | claret |

Compared with the colouring substances 1-(2'-chloro-4'-nitroanilino)-4-benzoylaminoanthraquinone and 1-(2'-chloro-4'-nitroanilino)-4-acetylaminoanthraquinone, known from the German Offenlegungsschrift No. 2,632,651, the comparative products according to Examples 34 and 35, respectively, have the advantage of a better thermostability when being processed in melted polyester.

EXAMPLES 50–85

A solution of 3.5 parts of bromine in 20 parts of nitrobenzene is added, with stirring, to 8.4 parts of 1-anilino-4-benzoylaminoanthraquinone in 80 parts of nitrobenzene; stirring is then maintained for 18 hours at 25° and subsequently for 3 hours at 60°–65°. The reaction product, which has precipitated in crystalline form on cooling, is filtered off with suction, washed with a small amount of nitrobenzene and then with alcohol, and dried at 80° in vacuo. There are obtained 9 parts of a blue colouring substance containing 16–17% of bromine, which colouring substance dyes polyester in the melt according to Example 1 in pure blue shades having very good fastness to light, and which exhibits a good behaviour with respect to the test criteria according to Examples 1a, b and c.

Analogous colouring substances are obtained by corresponding bromination of the starting materials listed in the following Table:

| Example | Starting comound | Bromine content % | Shade |
|---|---|---|---|
| 51 | 1-anilino-4-(4'-chlorobenzoyl-amino)-anthraquinone | 15.5–16.5 | blue |
| 52 | 1-(4'-toluidino)-4-benzoyl-aminoanthraquinone | 16–18 | blue |
| 53 | 1-anilino-4-(2'-chlorobenzoyl-amino)-anthraquinone | 18–19 | violet |
| 54 | 1-anilino-4-(3'-chlorobenzoyl-amino)-anthraquinone | 14.5–15.5 | blue |
| 55 | 1-anilino-4-(2'-fluorobenzoyl-amino)-anthraquinone | 15.5–16.5 | violet |
| 56 | 1-anilino-4-(2',5'-dichloro-benzoylamino)-anthraquinone | 14–15 | violet |
| 57 | 1-anilino-4-(4'-hydroxy-benzoylamino)-anthraquinone | 18–19 | blue |
| 58 | 1-anilino-4-(4'-methylbenzoyl-amino)-anthraquinone | 17–18 | blue |
| 59 | 1-anilino-4-(2',4'-dimethyl-benzoylamino)-anthraquinone | 15.2–16.2 | blue |
| 60 | 1-anilino-4-(4'-methoxy-benzoylamino)-anthraquinone | 16–17 | blue |
| 61 | 1-anilino-4-(4',2''-acetoxy-ethyloxybenzoylamino)-anthraquinone | 14.5–15.0 | blue |
| 62 | 1-anilino-4-(4'-phenylbenzoyl-amino)-anthraquinone | 13–14 | blue |
| 63 | 1-anilino-4-(4'-phenoxy-benzoylamino)-anthraquinone | 13–14 | blue |
| 64 | 1-anilino-4-(2'-thiophenoyl-amino)-anthraquinone | 15–17 | blue |
| 65 | 1-(4'-toluidino)-4-(4'-chloro-benzoylamino)-anthraquinone | 13–15 | violet |
| 66 | 1-(2'-ethylanilino)-4-benzoylaminoanthraquinone | 15.0–15.5 | blue |
| 67 | 1-(4'-ethylanilino)-4-benzoylaminoanthraquinone | 15–15.5 | blue |
| 68 | 1-(4'-methoxyanilino)-4-benzoylamionoanthraquinone | 15–15.5 | blue |
| 69 | 1-(2',4'-dimethylanilino)-4-benzoylaminoanthraquinone | 15–15.5 | violet |
| 70 | 1-(2',4'-dimethylanilino)-4-(4'-chlorobenzoylamino)-anthraquinone | 13.5–14.5 | violet |
| 71 | 1-(2',4'-dimethylanilino)-4-(4'-phenylbenzoylamino)-anthraquinone | 12.5–13.5 | violet |
| 72 | 1-(2',5'-dimethylanilino-4-benzoylaminoanthraquinone | 15–15.5 | blue |
| 73 | 1-(2',4',6'-trimethylanilino)-4-(2'-thiophenoylamino)- | 10–15 | violet |

| Example | Starting compound | Bromine content % | Shade |
|---|---|---|---|
| | anthraquinone | | |
| 74 | 1-(2'-chloroanilino)-4-benzoylaminoanthraquinone | 15–15.5 | violet |
| 75 | 1-(3'-chloroanilino)-4-benzoylaminoanthraquinone | 15–15.5 | violet |
| 76 | 1-(4'-chloroanilino)-4-benzoylaminoanthraquinone | 15–15.5 | violet |
| 77 | 1-(2',5'-dichloroanilino)-4-benzoylaminoanthraquinone | 13–14 | violet |
| 78 | 1-anilino-5-benzoylaminoanthraquinone | 16–16.5 | claret |
| 79 | 1-(4'-ethylanilino)-5-benzoylaminoanthraquinone | 15–15.5 | claret |
| 80 | 1-(2',4'-dimethylanilino)-5-benzoylaminoanthraquinone | 13.5–15.5 | red |
| 81 | 1-(2',5'-dimethylanilino)-5-benzoylaminoanthraquinone | 15–15.5 | claret |
| 82 | 1-anilino-8-benzoylaminoanthraquinone | 15.5–16.5 | claret |
| 83 | 1-(4'-ethylanilino)-8-benzoylaminoanthraquinone | 15–15.5 | claret |
| 84 | 1-(2',4'-dimethylanilino)-8-benzoylaminoanthraquinone | 13–15 | claret |
| 85 | 1-(2',5'-dimethylanilino)-8-benzoylaminoanthraquinone | 15–15.5 | claret |

EXAMPLE 86

8.4 parts of 1-anilino-4-benzoylaminonthraquinone are treated according to Example 50 but with double the amount of bromine. There are obtained 10 parts of a crystalline colouring substance having a bromine content of 27.5–28%, which colouring substance dyes polyester according to Example 1 in violet shades having excellent fastness properties.

A similar violet colouring substance having a bromine content of 23–24% can be obtained analogously starting with 1-(4'-toluidino)-4-benzoylaminoanthraquinone.

EXAMPLE 87

The colouring substance according to Example 50 is applied according to the procedure of Example 1 at a strength of 2%. There is obtained a blue dyeing having excellent fastness to light and possessing outstanding properties with respect to the test criteria of 1a, b and c. Corresponding properties, particularly also with regard to the last-mentioned test criteria, are likewise exhibited by the colouring substances of the Examples 28, 51, 52, 58, 88, 89 and 95 in the case of 2% application.

EXAMPLES 88–97

1-Benzoylamino-5-phenylmercaptoanthraquinone is applied according to Example 1 in polyester. There is obtained a deeply coloured yellow dyeing having excellent fastness to light and possessing also excellent fastness properties with respect to the test criteria according to Examples 1b and 1c.

Analogous dyeings are obtained with use of the colouring substances listed below:

| Example | Colouring substance | Shade on PES |
|---|---|---|
| 89 | 1-benzoylamino-4-phenylmercapto-anthraquinone | scarlet |
| 90 | 1-(4'-chlorobenzoylamino)-4-phenylmercaptoanthraquinone | scarlet |
| 91 | 1-(4'-methylbenzoylamino)-4-phenylmercaptoanthraquinone | scarlet |
| 92 | 1-acetylamino-4-phenylmercaptoanthraquinone | scarlet |
| 93 | 1-(4'-tert.-butylbenzoylamino)-4-phenylmercaptoanthraquinone | red |
| 94 | 1-benzoylamino-5-(4'-methylphenyl-mercapto)-anthraquinone | yellow |
| 95 | 1-acetylamino-5-phenyl-mercaptoanthraquinone | yellow |
| 96 | 1-benzoylamino-8-phenyl-mercaptoanthraquinone | yellow |
| 97 | 1-acetylamino-8-phenyl-mercaptoanthraquinone | yellow |

EXAMPLE 98

13.1 parts of 1-benzoylamino-4-phenylmercaptoanthraquinone are brominated in 90 parts of nitrobenzene by the addition of 5.3 parts of bromine in 10 parts of nitrobenzene, using a procedure analogous to that of Example 50. There are obtained 11 parts of a monobrominated colouring substance containing 15.5% of bromine, which colouring substance dyes polyester according to Example 1 in scarlet shades having excellent fastness properties. Corresponding monobrominated derivatives, which are likewise suitable for the melt dyeing of polyester, are obtained by analogous bromination of the colouring substances according to Examples 88, 90 and 91.

EXAMPLE 99

After conversion into a finely divided form, 21 parts of 1-anilino-4-benzoylaminoanthraquinone are suspended in 580 parts of water. To the suspension are added, with stirring, 285 parts of 30% hydrochloric acid, and subsequently within ½ hour 8.8 parts of bromine. After 16 hours' stirring at 70°, the reaction product is filtered off, washed neutral with water and dried. There are obtained 24 parts of a dark blue powder having a melting point of 207°–209°. The colouring substance, corresponding to that of Example 50, dyes polyester in the melt in blue shades having very good fastness properties.

EXAMPLE 100

To a suspension of 12.6 parts of 1-anilino-4-benzoylaminoanthraquinone in 75 parts of anhydrous nitrobenzene are added dropwise within 15 minutes, after the addition of 0.07 g of iodine, a solution of 4.5 parts of sulphuryl chloride in 25 parts of anhydrous nitrobenzene. Stirring is then maintained for 18 hours at room temperature and subsequently for 6 hours at 60°–65°, and the reaction mixture is subsequently worked up analogously to Example 50. A colouring-substance mixture having a chlorine content of 7.8–8.5% is obtained, which mixture consists, according to its thin-layer chromatogram, mainly of 1-(4'-chloroanilino)-4-benzoylaminoanthraquinone besides 1-(2'-chloroanilino)-4-benzoylaminoanthraquinone, and dyes polyester according to Example 1 in clear blue shades having excellent fastness properties.

Analogous colouring substances are obtained by corresponding chlorination of the starting materials listed in the following Table:

| Example | Starting compound | Chlorine content % | Shade |
|---|---|---|---|
| 101 | 1-anilino-4-(2'-chlorobenzoyl- | 11–14.6 | violet |

| Example | Starting compound | Chlorine content % | Shade |
|---|---|---|---|
| | amino)-anthraquinone | | |
| 102 | 1-anilino-4-(3'-chlorobenzoyl-amino)-anthraquinone | 13.5–14.6 | blue |
| 103 | 1-anilino-4-(2'-fluorobenzoyl-amino)-anthraquinone | 7.5–8 | violet |
| 104 | 1-anilino-4-(4'-methylbenzoyl-amino)-anthraquinone | 6.5–7.6 | blue |
| 105 | 1-anilino-4-(3',4'-dimethyl-benzoylamino)-anthraquinone | 7.3–7.6 | blue |
| 106 | 1-anilino-4-(4'-methoxy-benzoylamino)-anthraquinone | 7.3–8 | blue |
| 107 | 1-anilino-4-acetylamino-anthraquinone | 9–10 | blue |
| 108 | 1-(4'-toluidino)-4-benzoyl-aminoanthraquinone | 6.5–7.6 | blue |
| 109 | 1-(4'-toluidino)-4-(4'-chlorobenzoylamino)-anthraquinone | 13.5–14 | violet |
| 110 | 1-(2',4'-dimethylanilino)-4-(4'-chlorobenzoylamino)-anthraquinone | 13.5–14 | violet |

EXAMPLE 111

If 1-(2',4',6'-trimethylanilino)-4-benzoylaminoanthraquinone is chlorinated according to Example 100 with the double equivalent amount of sulphuryl chloride, there is obtained a colouring substance which contains 12.5–13.5% of chlorine and which dyes polyester according to Example 1 in fast violet shades.

Starting with 1-(2',4'-dimethylanilino)-4-acetylaminoanthraquinone, there is correspondingly obtained a violet colouring substance containing 14.5–15.5% of chlorine.

EXAMPLE 112

Polyester is treated according to Example 1 with the colouring-substance mixture obtainable according to Example 3 of the French Pat. No. 1,571,171 by condensation of 1-amino-4-benzoylaminoanthraquinone and 1,2,4-trichlorobenzene. A fast violet dyeing is obtained.

EXAMPLE 113

Into 100 parts of alcohol are introduced 3.6 parts of 85% potassium hydroxide and subsequently 6 parts of thiophenyl, and stirring is maintained for 30 minutes. There are then added 18.6 parts of 1-benzoylamino-5-nitroanthraquinone and a further 150 parts of alcohol, and, whilst a stream of nitrogen is being passed through, the mixture is heated to boiling and stirred for 3.5 hours under reflux. After cooling, filtration with suction is performed and the residue is thoroughly washed with alcohol and water and dried at 80° in vacuo. There is obtained, with excellent yield, 1-benzoylamino-5-phenylmercaptoanthraquinone, the colouring substance according to Example 88.

EXAMPLE 114

1000 parts of polyethyleneterephthalate granulate, 10 parts of titanium oxide (Kronus RN 40) and 2 parts of the colouring substance according to Example 35 are mixed in a closed vessel for 2 hours on a rolling device. The dyed granulate is extruded at about 260° into strands of 2 mm diameter and again granulated. The resulting granulate is injection moulded at 270°–280° in an anchor injection-extrusion automatic machine into moulded articles. There is obtained a delustered moulded article dyed in a violet shade.

We claim:

1. A process for dyeing polyesters in the melt, by intimately mixing with said polyester in the melt, an anthraquinone derivative of the formula

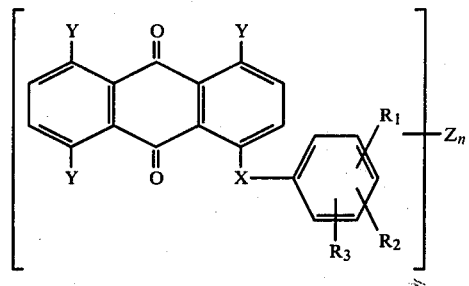

wherein $R_1$ is hydrogen, halogen, alkyl or alkoxy having 1–4 C atoms, and $R_2$ and $R_3$ are hydrogen, halogen or alkyl having 1–4 C atoms, with $R_2$ and $R_3$ being hydrogen if $R_1$ is alkoxy, X is an —NH— group or an —S— atom, one Y is the radical of the formula —NHCOR and the other two Y groups are hydrogen, with R being alkyl having 1–4 C atoms, a mononuclear five- or six-membered heterocyclic radical or a radical of the formula

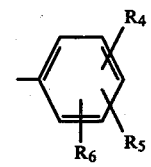

in which $R_4$ is hydrogen, halogen, hydroxyl, alkyl or alkoxy having 1–4 C atoms, phenyl or phenoxy, $R_5$ is hydrogen, halogen or alkyl having 1–4 C atoms and $R_6$ is hydrogen or halogen, with $R_6$ being halogen if $R_4$ is halogen or alkyl, Z is halogen and n is 0, 1, 2 or 3, and 1–3 Z's can be bound as substituents $R_1$ to $R_3$ and/or as substituents on the anthraquinone nucleus or on the radical R.

2. Process according to claim 1, wherein halogen denotes chlorine or bromine.

3. Process according to claim 1, wherein the dyestuffs used are anthraquinone derivatives of the formula

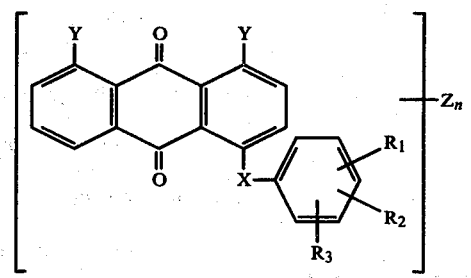

wherein n is 0, 1 or 2 if halogen is on the anthraquinone nucleus or as radical $R_1$ to $R_3$ in the molecule, and X is an —NH— group or an —S— atom, one Y is a radical of the formula —NHCOR and the other Y is hydrogen, and R, $R_1$, $R_2$ and $R_3$ have the meanings given in claim 1.

4. Process according to claim 1, wherein the dyestuffs used are anthraquinone derivatives of the formula

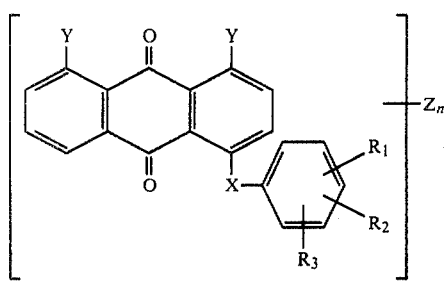

wherein n is a number from 1 to 3, X is an —NH— group or an —S— atom, one Y is a radical of the formula —NHCOR and the other Y is hydrogen, and Z, R, $R_1$, $R_2$ and $R_3$ have the meanings given in claim 1.

5. Process according to claim 4, wherein the dyestuffs used are anthraquinone derivatives of the formula

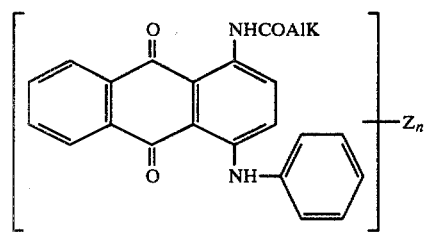

wherein AlK1 is methyl or ethyl.

6. Process according to claim 4, wherein the dyestuffs used are anthraquinone derivatives of the formula

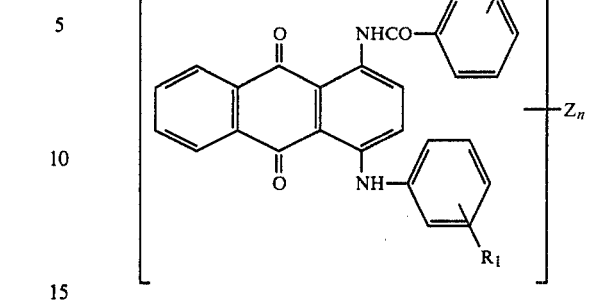

wherein $R_1$, $R_4$, Z and n have the meanings given in claim 1.

7. Process according to claim 4, wherein the dyestuffs used are anthraquinone derivatives of the formula

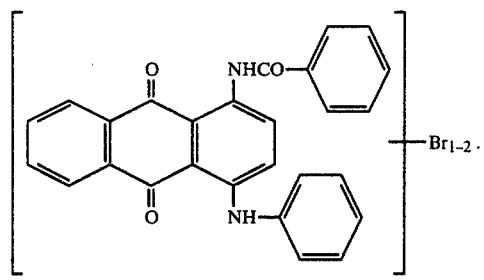

8. Process according to claim 1, wherein the dyestuffs used are anthraquinone derivatives of the formula

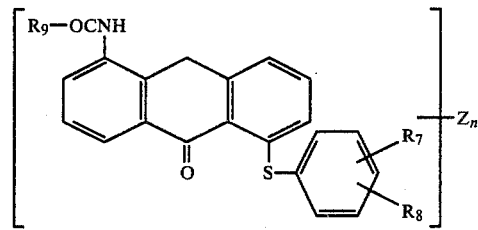

wherein $R_7$ and $R_8$ are hydrogen or methyl or ethyl groups, and $R_9$ is a methyl group, or a phenyl group optionally substituted by chlorine or by a methyl or ethyl group, and Z and n have the meanings given in claim 1.

9. A product prepared by the process according to claim 1.

* * * * *